United States Patent
Clapp et al.

(10) Patent No.: US 8,025,937 B2
(45) Date of Patent: Sep. 27, 2011

(54) BISTABLE FERROELECTRIC LIQUID CRYSTAL DEVICES

(75) Inventors: Terry Victor Clapp, Hertfordshire (GB); Fumito Nishida, Midland, MI (US); Jonathan Paul Hannington, Midland, MI (US); Russell Keith King, Midland, MI (US); Omar Farooq, Saginaw, MI (US); William Alden Crossland, Essex (GB); Joo-Nyung Jang, Yongin (KR); Huan Xu, Cambridge (GB); Anthony Bernard Davey, Cambridge (GB)

(73) Assignees: Dow Corning Corporation, Midland, MI (US); Cambridge Enterprise Ltd., Cambridge (GB)

( * ) Notice: Subject to any disclaimer, the term of this patent is extended or adjusted under 35 U.S.C. 154(b) by 153 days.

(21) Appl. No.: 12/296,612

(22) PCT Filed: Apr. 12, 2007

(86) PCT No.: PCT/US2007/009035
§ 371 (c)(1),
(2), (4) Date: Mar. 12, 2009

(87) PCT Pub. No.: WO2007/123844
PCT Pub. Date: Nov. 1, 2007

(65) Prior Publication Data
US 2009/0185129 A1    Jul. 23, 2009

Related U.S. Application Data (60) Provisional application No. 60/792,409, filed on Apr. 17, 2006.

(51) Int. Cl.
*C09K 19/40* (2006.01)
*C09K 19/12* (2006.01)
*C09K 19/20* (2006.01)

(52) U.S. Cl. .... 428/1.1; 349/100; 349/172; 252/299.01; 252/299.66; 252/299.67

(58) Field of Classification Search .................. 428/1.1, 428/1.3; 252/299.01, 299.61, 299.64, 299.65, 252/299.66, 299.67; 349/100, 172
See application file for complete search history.

(56) References Cited

U.S. PATENT DOCUMENTS
4,563,059 A    1/1986    Clark et al.
(Continued)

FOREIGN PATENT DOCUMENTS
EP    0032362 A1    7/1981
(Continued)

OTHER PUBLICATIONS

Olsson, et al., "A New Series of Siloxane Liquid Crystalline Dimers Exhibiting the Antiferroelectric Phase", Sep. 2005, pp. 1139-1150; Liquid Crystals, vol. 32, No. 9; http://www.tandf.co.uk/journals.

(Continued)

*Primary Examiner* — Shean Wu
(74) *Attorney, Agent, or Firm* — Brinks Hofer Gilson & Lione (57) ABSTRACT

A liquid crystal electro-optic device. The liquid crystal electro-optic device comprises at least one liquid crystal cell comprising: a pair of substrates having a gap therebetween; a pair of electrodes, the pair of electrodes positioned on one of the substrates or one electrode positioned on each substrate; and a ferroelectric, oligosiloxane liquid crystal material disposed in the gap between the pair of substrates, the ferroelectric, oligosiloxane liquid crystal material exhibiting an I-♦ SmC* phase sequence wherein the liquid crystal electro-optic device is bistable in operation. The invention also involves a method for making a liquid crystal electro-optic device.

27 Claims, 3 Drawing Sheets

U.S. PATENT DOCUMENTS

| | | | |
|---|---|---|---|
| 5,498,368 | A | 3/1996 | Coles |
| 5,547,604 | A | 8/1996 | Coles et al. |
| 5,690,858 | A | 11/1997 | Nohira et al. |
| 5,720,898 | A | 2/1998 | Nohira et al. |
| 5,764,327 | A * | 6/1998 | Hanyu et al. ............ 349/133 |
| 5,835,248 | A * | 11/1998 | Hanyu et al. ............ 349/124 |
| 5,942,155 | A | 8/1999 | Coles et al. |
| 5,972,241 | A | 10/1999 | Johnson et al. |
| 6,051,639 | A | 4/2000 | Mehl et al. |
| 6,277,451 | B1 | 8/2001 | Mehl et al. |
| 6,294,109 | B1 | 9/2001 | Ratna et al. |
| 6,737,124 | B2 | 5/2004 | Gough et al. |
| 6,783,812 | B2 | 8/2004 | Wand et al. |
| 6,838,128 | B1 | 1/2005 | Wand et al. |
| 7,351,452 | B2 | 4/2008 | Goodby et al. |
| 2002/0130299 | A1 | 9/2002 | Wand et al. |
| 2003/0003245 | A1 | 1/2003 | Gough et al. |
| 2004/0206933 | A1 | 10/2004 | Goodby et al. |
| 2005/0001200 | A1 | 1/2005 | Goodby et al. |

FOREIGN PATENT DOCUMENTS

| | | | |
|---|---|---|---|
| EP | 0643120 | A1 | 3/1995 |
| EP | 0778960 | B1 | 10/2001 |
| GB | 2274652 | A | 8/1994 |
| JP | 01268785 | A * | 10/1989 |
| WO | 9736908 | A1 | 10/1997 |
| WO | 9736947 | A1 | 10/1997 |
| WO | 03024903 | A1 | 3/2003 |
| WO | 03040074 | A1 | 5/2003 |
| WO | 03040812 | A1 | 5/2003 |
| WO | 2005019380 | A1 | 3/2005 |
| WO | 2007123844 | A1 | 11/2007 |
| WO | 2009054855 | A1 | 4/2009 |

OTHER PUBLICATIONS

Newton, et al., "A New Series of Low Molar Mass Ferroelectric Organosiloxanes With Unusual Electro-Optic Properties", 1993, pp. 379-387; Ferroelectrics, vol. 148; Gordon and Breach Science Publishers S.A., USA.

Goodby, et al., "Chiral Liquid Crystals for Ferroelectric, Electroclinic and Antiferroelectric Displays and Photonic Devices", 2000, pp. 2-14; Liquid Crystal Materials, Devices, and Flat Panel Displays, Proceedings of SPIE vol. 3955.

Walba, et al., "Chiral SmA* Materials for Display Applications?", 2007, pp. 585-588; Journal of the SID, USA.

Owen, et al., "Comparison of Mesomorphic Behaviour and Electro-Optic Properties of Ferroelectric Mesogens With and Without Disiloxane End-Groups", 1995, pp. 563-575; Mol. Cryst. Liq. Cryst., vol. 265; Overseas Publishers Association, Malaysia.

Manolis, et al., "Control of the Electro-Optic Bistability of Some Ferroelectric Liquid Crystals Useful for Binary Phase Optical Modulators", 2000, pp. 305-314; Mol. Cryst. And Liq. Cryst., vol. 351; Overseas Publishers Association, Malaysia.

Lagerwall, et al., "Current Topics in Smectic Liquid Crystal Research", 2006, pp. 20-45; www.Chemphyschem.org.

Crossland, et al., "Electro-Optical Bistability in Ferroelectric Liquid Crystal Switching Devices for Use in Displays and Real-Time Holography", 2004, pp. 3-23; Ferroelectrics, vol. 312, Taylor & Francis, UK.

Hadeler, et al., "Fast Electro-Optic Liquid Crystal Switch and Attenuator With Large Extinction Ratio at 1550 nm", pp. 1-6.

Robinson, et al., "Ferroelectric and Antiferroelectric Low Molar Mass Organosiloxane Liquid Crystals", 1998, pp. 301-307; Liquid Crystals, vol. 25, No. 3; Taylor & Francis Ltd.

Redmond, et al., "Ferroelectric and Electroclinic Characterisation of a New Organic Siloxane Bimesogen", 1993, pp. 323-336; Ferroelectrics, vol. 148; Gordon and Breach Science Publishers S.A., USA.

Wilkinson, et al., "Liquid Crystal Materials and Applications for the Next Generation of Microdisplays", 2003, pp. 57/[171[-65/[179]; Mol Cryst. Liq. Cryst., vol. 401; Taylor & Francis, Inc., UK.

Pivnenko, et al., "Optical and Electro-Optical Properties of Bimesogenic Organosiloxane Antiferroelectric Liquid Crystals With Molecular Tilt Approaching 45 Degrees", Feb. 2005, pp. 173-181; Liquid Crystals, vol. 32, No. 2, Taylor & Francis, http://www.tandf.co.uk/journals, UK.

De Hondt, et al., "Perylene-Baseed Fluorescent Liquid Crystal Dye guest-Host Mixtures", 2001, pp. 263-270; Mol. Cryst and Liq. Cryst., vol. 366; Overseas Publishers Association, USA.

Li, et al., "Siloxane-Terminated Phenylpyrimidine Liquid Crystal Hosts", Mar. 5, 2007, pp. 2313-2318; Journal of Materials Chemistry, vol. 17; The Royal Society of Chemistry, www.rsc.org/materials.

Pivnenko, et al., Novel Electroclinic Organosiloxane Materials for Optoelectronic Devices, pp. 1-12; Proceedings of SPIE 5289, SPIE/IS, Bellingham WA, USA.

International Search Report and Written Opinion, Sep. 3, 2007 for International Application No. PCT/US2007/009035, pp. 1-16.

* cited by examiner

BISTABLE FERROELECTRIC LIQUID CRYSTAL DEVICES

The present invention relates generally to liquid crystal devices, and more particularly to liquid crystal devices having improved performance.

Ferroelectric liquid crystal (FLC) electro-optical devices have attracted significant attention, due to their potential to exhibit very fast response times combined with bistability. Chiral Smectic C (SmC*) phase liquid crystals and electro-optic devices based upon these materials are described in detail in a number of comprehensive reviews and text books, for example "Ferroelectric Liquid Crystals—A Unique State of Matter," D. M. Walba, Advances in the Synthesis and Reactivity of Solids, Volume 1, 173-235, 1991; "Ferroelectric and Antiferroelectric Liquid Crystals," S. T. Lagerwall, Ferroelectrics, 301, 15-45, 2004; and Chapter 9 "Optical properties of ferroelectric and antiferroelectric liquid crystals," in The Optics of Thermotropic Liquid Crystals, Edited by S. Elston and R. Sambles, 1998. The combination of fast electro-optic response and bistability has significant potential for the development of a wide range of devices, for use in applications such as display panels, projection devices, spatial light modulators, etc. However, the commercialization of such devices has been limited by a number of technical problems.

Initial publications in the field describe thin, shear-aligned cells which can exhibit good bistability. See N. A. Clark and S. T. Lagerwall, "Submicrosecond bistable electro-optic switching in liquid crystals," Appl. Phys. Lett. 36, 899-901 (1980). The currently accepted route to electro-optical devices based upon chiral smectic C liquid crystals is the Surface Stabilized Ferroelectric Liquid Crystal Device, as described in U.S. Pat. No. 4,367,924, entitled "Chiral Smectic C or H Liquid Crystal Optical Device". In such devices, alignment films are used on the inner surfaces of the device, adjacent to the liquid crystal, to create planar alignment of the liquid crystal phase. The ideal orientation of the liquid crystal layers within such a device is the so-called 'bookshelf' structure. Such devices are often fabricated using liquid crystal materials, or mixtures, with the following phase sequence on cooling:

Isotropic (I)→chiral nematic (N*)→chiral smectic A (SmA*)→chiral smectic C (SmC*).

However, the bookshelf structure is mechanically fragile and unstable. This fragility has hindered the deployment of devices based upon the bookshelf geometry, due to concerns that a temperature excursion or mechanical shock could disrupt the carefully prepared bookshelf geometry, which could not be practically reformed in a deployed device. As noted above, a controlled temperature gradient, allowing the material to re-cool through the desired liquid crystal phase sequence would be required to form the bookshelf structure.

Even under controlled conditions, the bookshelf structure is not easily attainable for the majority of chiral smectic C materials. When the materials are cooled from the chiral smectic A phase into the chiral smectic C phase, the tilting of the molecules results in a contraction of the smectic layer spacing resulting in the formation of chevron structures and so called 'zig-zag defects', which degrade the electro-optical performance of the cell. In some cases, electric field treatment can be used to convert the chevron structure into a 'pseudo-bookshelf' structure; however, such structures are difficult to form and can revert to the chevron structure during the storage or operation of the device. In practice, FLC manufacturers employ the chevron structure in devices and accept the penalties with respect to reduced contrast and the sacrifice of bistability.

Despite the complications related to the fragility of the bookshelf geometry and the formation of chevron structures, with their associated zig-zag defects, there are many references citing fast-switching, wide viewing angle, 'bistable' electro-optic devices based upon liquid crystals with chiral smectic C phases. For a ferroelectric liquid crystal device to reach its full potential in terms of electro-optical performance, it must be durable in use and exhibit 'true optical bistability'. U.S. Pat. No. 6,870,163 B1, entitled Ferroelectric Liquid Crystal Devices Using Materials with a DeVries Smectic A Phase, reports that 'true optical bistability' is only obtained for a small number of liquid crystals exhibiting the chiral smectic C phase, and further notes that such materials are examples of materials exhibiting a DeVries SmA* phase above the chiral smectic C phase due the limited shrinkage of the smectic layers during the chiral smectic A to chiral smectic C phase transition.

U.S. Pat. Nos. 5,748,164 and 6,507,330 B1 highlight degradation of the device performance in non bistable ferroelectric electro-optic devices. In practice, a data frame is DC-balanced by the application of an inverse image frame complicating the driving scheme and compromising the brightness. Ferroelectric liquid crystal devices exhibiting 'true optical bistability' only require the application of an electric field during reorientation, thus significantly reducing the complexity of the addressing scheme and increasing the illumination and power efficiency of the device.

Therefore, there is a need for truly bistable liquid crystal electro-optic devices, and for methods of making such devices.

The present invention meets this need by providing a truly bistable liquid crystal electro-optic device. The liquid crystal electro-optic device comprises at least one liquid crystal cell comprising: a pair of substrates having a gap therebetween; a pair of electrodes, the pair of electrodes positioned on one of the substrates or one electrode positioned on each substrate; and a ferroelectric, oligosiloxane liquid crystal material disposed in the gap between the pair of substrates, the ferroelectric, oligosiloxane liquid crystal material exhibiting an I→SmC* phase sequence with the proviso that the ferroelectric, oligosiloxane liquid crystal material is not:

where R=alkyl group having from 1 to 10 carbon atoms or the group

R'=an alkyl group having from 1 to 4 carbon atoms; T=OOC or COO; X=alkyl group having at least one chiral center or halogen-substituted alkyl group having at least one chiral center; Y=F; m=0, 1, 2; p=1, 2, 3, 4; and n=10, 11, 12; and wherein the liquid crystal electro-optic device is bistable in operation. By "oligosiloxane liquid crystal material" we mean an oligosiloxane-organic hybrid material exhibiting at least one liquid crystalline phase.

Another aspect of the invention is a method of making a liquid crystal device. The method comprises providing a pair of substrates with a pair of electrodes thereon, the pair of electrodes positioned on one of the substrates or one electrode positioned on each substrate, the pair of substrates having a gap therebetween; providing a ferroelectric, oligosiloxane liquid crystal material in the gap between the pair of substrates, the ferroelectric, oligosiloxane liquid crystal material exhibiting an I→SmC* phase sequence with the proviso that the ferroelectric, oligosiloxane liquid crystal material is not:

where R=alkyl group having from 1 to 10 carbon atoms or the group

R'=an alkyl group having from 1 to 4 carbon atoms; T=OOC or COO; X=alkyl group having at least one chiral center or halogen-substituted alkyl group having at least one chiral center; Y=F; m=0, 1, 2; p=1, 2, 3, 4; and n=10, 11, 12; and applying a first electric field to align the liquid crystal electro-optic device while cooling the ferroelectric, oligosiloxane liquid crystal material into the SmC* phase or while the ferroelectric, oligosiloxane liquid crystal material is in the SmC* phase, or both, to create a monodomain; wherein the liquid crystal electro-optic device is bistable in operation.

DETAILED DESCRIPTION OF THE INVENTION

Electro-optic bistability is the basis of the remarkable ability of some FLC displays to be passively multiplexed (i.e., to operate without positioning transistor circuitry at each pixel). Achieving robust bistable surface alignment has been a major uncertainty in developing large area FLC display panels. FLC liquid crystal on silicon (LCoS) devices typically do not rely on bistability and must switch off the illumination at intervals. As the cells of the present invention are truly bistable, they can have a continuously valid image.

Bistability is also required for the use of FLCs in devices for storing or accumulating information, e.g., optically addressed spatial light modulators for ultra high resolution displays for holographic systems. Latching switches for telecommunications applications also need to be bistable.

In one embodiment, the present invention relates to a fast-switching bistable electro-optic device containing ferroelectric, oligosiloxane liquid crystal materials exhibiting a direct isotropic to SmC* phase transition. Thermotropic liquid crystals with a direct Isotropic to chiral smectic C (I to SmC*) phase transition are defined as materials which pass directly from a state where there is no positional ordering of molecules (I), into a layered state, where the optically active molecules are arranged in layers, with the director (or average molecular orientation) tilted at an angle, θ, with respect to the layer normal (SmC*). The presence of an SmC* phase is generally confirmed by the use of X-Ray diffraction, microscopic textures and miscibility studies, as described by Gray and Goodby, in "Smectic Liquid Crystals—Textures and Structures," 1984. The detection of a spontaneous polarization reorientation peak using a current reversal technique with a triangular waveform, such as that described by Miyasato et al., Jpn. J. Appl. Phys. 22, L661 (1983), can be used in conjunction with the above techniques to confirm the presence of an SmC* phase. By "bistable" we mean that no substantial relaxation of the two possible switched states of the liquid crystal can be observed after the removal of field.

The ferroelectric, oligosiloxane liquid crystal materials can be aligned using the method known in the art. Use of the invention does not require heating or cooling cycles to create the alignment required for bistable switching. Re-alignment can be carried out after manufacture of the device, allowing repair of the device.

The ferroelectric, oligosiloxane liquid crystal materials can be aligned to prepare large domains with few defects and high contrast ratios. The tilt angle of the material desirably does not change significantly with temperature, minimizing the need for active temperature compensation.

The ferroelectric, oligosiloxane liquid crystal material can be combined with other ferroelectric liquid crystal materials, if desired. The other ferroelectric liquid crystal material can be included at a level of 50% or below, or 20% or below, or 5% or below.

Figure 1:
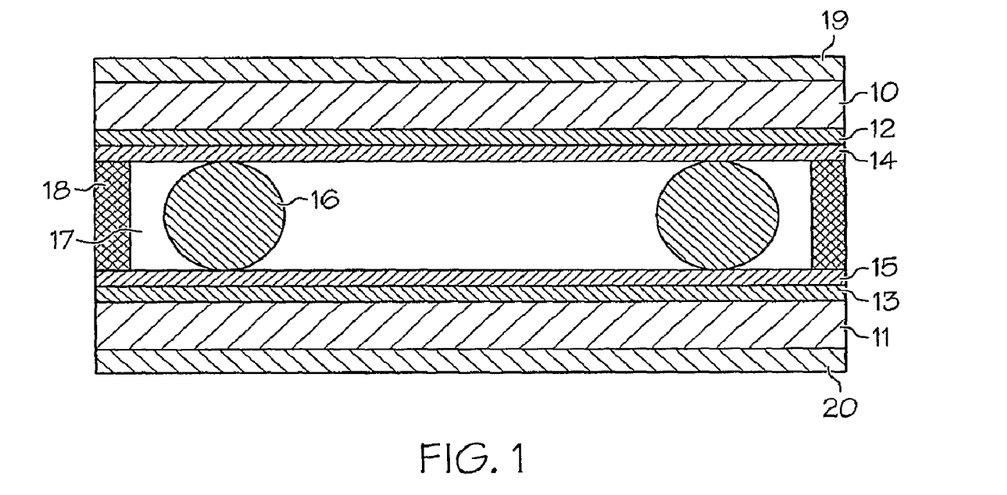
FIG. 1 is a cross section of one embodiment of a device of the present invention.

According to one aspect of the invention, a bistable liquid crystal cell is provided. FIG. 1 shows the structure of a typical device. The ferroelectric, oligosiloxane liquid crystal material 17 is placed between two substrates 10, 11. The substrates can be made of any suitable material, such as glass, silicon, organic polymers, or inorganic polymers, for example. One or both of the substrates can be transparent, depending on the class of device.

The inner surfaces of the substrates 10, 11 have electrodes 12, 13, e.g. aluminum or indium tin oxide (ITO), which can be applied in selected regions. One electrode can be on each substrate, or both electrodes can be on one of the substrates (but only one pair of electrode is required). One or both of the electrodes is transparent, depending on the device. Alternatively, there can be electrodes providing fringing fields, enabling the electro-optic effects to be controlled. The inner surface of the electrode may be coated with a passivation layer, if desired.

The inner surface of the electrode (adjacent to the liquid crystal material), or the substrate in the case of the fringing field device, can be coated with alignment layers 14, 15 in order to facilitate the electric field alignment, the layer orientation and the switching of the SmC* phase. The alignment layer can be an organic coating, or an inorganic coating. Suitable alignment layers include, but are not limited to, polyamide, polyimide, polyester, polytetrafluoroethylene, silicon oxides, silanes, and polysilanes. The alignment layer can be formed by any method known in the art, including, but not limited to, rubbing, stretching, deposition, and embossing. The alignment layer helps the monodomain to form (i.e., "the bookshelf"), and bistable switching to be observed.

Spacers 16 separate the substrates 10, 11, and define the cell thickness. A sealing layer 18 is used to retain the liquid crystal material in the cell. The liquid crystal electro-optic devices of the present invention typically have a cell gap designed to be in the range of 0.5 microns to 10 microns.

The laminated device can be placed between polarizers 19, 20 oriented at 90 degrees to each other (optic axis) to generate bright or dark states when the liquid crystal is switched between two states. The device described in FIG. 1 is a transmission mode device. Alternative polarizer configurations, known to those skilled in the art, may be used for transmission and reflective mode devices.

The liquid crystal cell can be used in devices including, but not limited to, active matrix direct view FLC flat panel displays, passive matrix direct view FLC displays, and liquid crystal on silicon (LCoS) devices.

Suitable oligosiloxane liquid crystal materials include, but are not limited to, the following:

One class of compounds has the formula:

Where R=W, or $C_dH_{2(d+1)}$ and d=1-10 and W= or pyrimidines, or tolanes;

Where R', and R"=are independently selected from $C_rH_{2(r+1)}$ and r=1 to 4, or a phenyl group; c=1 to 10; n=3-14; a=0 or 1; m=1 or 2; s=1 or 2; q=0 or 1, where T=O, COO, OCO, CH=N, N=CH, $CF_2O$, $OCF_2$, NHCO, or CONH; Y=is independently selected from H, halogen, $NO_2$, CN, $CH_3$, $CF_3$; L=is independently selected from H or a halogen; Q=O, COO, or OCO, where b=0 or 1; and X=an alkyl group with at least one chiral center or halo-substituted alkyl group with at least one chiral center.

Different types of oligosiloxane liquid crystal materials can be used. For example, various types of mesogens can be joined to siloxanes (AB type). Symmetrical systems in which a siloxane links two mesogens of the same family (ABA type) can be used. Asymmetrical systems in which two different mesogen families are joined by a siloxane (ABC type) can also be used.

One example of a suitable compound is shown below.

'solid'→44° C.→SmC*→87° C.→Iso

The use of the phase classification 'solid' in this and later examples, implies a phase in which ferroelectric switching is not observed within a timescale of 1 second upon the application of electric fields of <50V/μm.

Another example of suitable compounds based on an ester is shown below.

Where f=6-8.

Another class of suitable compounds is terphenyls having the formula:

Where R=W, or $C_dH_{2(d+1)}$ and d=1-10 and
W= or pyrimidines, or tolanes:

Where R' and R"=are independently selected from $C_rH_{2(r+1)}$ and r=1 to 4, or a phenyl group; c=1 to 10; n=3-14; a=0 or 1; L=is independently selected from H or a halogen; m=1 or 2; s=1 or 2; q=0 or 1, where T=O, COO, OCO, CH=N, N=CH, $CF_2O$, $OCF_2$, NHCO, or CONH; Y=is independently selected from H, halogen, $NO_2$, CN, $CH_3$, $CF_3$; Q=O, COO, or OCO, where b=0 or 1; and X=an alkyl group with at least one chiral center or halo-substituted alkyl group with at least one chiral center.

Other classes of compounds which provide suitable oligosiloxane liquid crystal materials include, but are not limited to, pyrimidines, or tolanes.

Using the present invention, bistable switching was demonstrated using polyamide (nylon) as the alignment layer. Small imperfections were easily repaired by electric field treatment.

Appropriate voltages can be made available in FLC direct view displays or in liquid crystal on silicon (LCoS) devices so that the devices can be initially aligned. The materials can be aligned efficiently in the SmC* phase using electric fields to form uniformly-aligned monodomain with minimal defects (e.g., domain boundaries, and randomly aligned domains). When the materials have been uniformly aligned, the LC media can be rotated to the proper orientation, and if necessary restored in situ.

A square wave electric field can be used for the initial cell alignment. If the monodomain needs to be rotated to achieve a proper orientation, an asymmetric waveform is generally applied, but careful consideration of field parameters such as waveform, amplitude, frequency, DC offset, etc. is important, as it has been shown that the optimal range varies from compound to compound. The electric field typically has a value in the range of about 1 to about 25 V/μm at a frequency having a value in the range of about 10 Hz to about 25 kHz. In the present invention, the bistability is maintained even after the rotation.

Example 1

Data for 3 oligosiloxane-terphenyl mesogens is presented in Table 1. Tilt angles and spontaneous polarization were determined using devices which had been aligned and rotated using electric fields. Liquid crystal test cells with cell gaps between 3 and 4.5 μM with anti-parallel rubbed nylon alignment layer were used.

TABLE 1

Liquid crystal phase, tilt angle and spontaneous polarization data for oligosiloxane-terphenyl mesogens.

Sample: 1A

Phase Behaviour*  Solid → 37.6 C. → SmC* → 85.5 C. → I
Properties for electric field  θ = 39°, Ps = 60 nC/cm2
aligned device  Both at 40° C.

Sample: 1B

TABLE 1-continued

Liquid crystal phase, tilt angle and spontaneous polarization data for oligosiloxane-terphenyl mesogens.

| | |
|---|---|
| Phase Behaviour* | Solid → 36.0 C. → SmC* → 94.3 C. → I |
| Properties for electric field | θ = 42°, Ps = 175 nC/cm2 |
| aligned device | Both at 40° C. |

Sample: 1C

Me₃Si(OSiMe₂)₄—(CH₂)₁₁—O—[terphenyl with F,F]—O—[chiral octyl]

| | |
|---|---|
| Phase Behaviour* | Solid → 26.2 C. → SmC* → 63.2 C. → I |
| Properties for electric field | θ = 44°, Ps = 33 nC/cm2 |
| aligned device | Both at 40° C. |

Transition temperatures quoted are peak values from Differential Scanning Calorimetry (Heating cycle).
θ = tilt angle, Ps = spontaneous polarization.

Example 2

A test cell containing compound 2A (n=1; Iso→87° C.→SmC*→44° C.→Solid; θ~45°) was made by filling cells having with anti-parallel rubbed nylon alignment layer and a gap varying between 1.5 and 3.5 μm. The applied voltage was generated with a Hewlett Packard 33120A function generator and amplified by a Hewlett Packard 6827A Bipolar Power Supply/Amplifier. The layer reorientation process was observed using a Vickers Photoplan polarizing microscope. Instec HCS302 hot stage controlled with an Instec STC200 was used to control the temperature of the sample. A single domain bookshelf structure was formed on cooling from the isotropic phase to a temperature below the clearing point with a symmetric square wave voltage. The amplitude of the alignment field ranged from 5V/μm to 8V/μm with a frequency of 200 Hz-2 kHz depending on the temperature during the cooling process. A single domain was confirmed visually after the alignment process.

Figure 2:
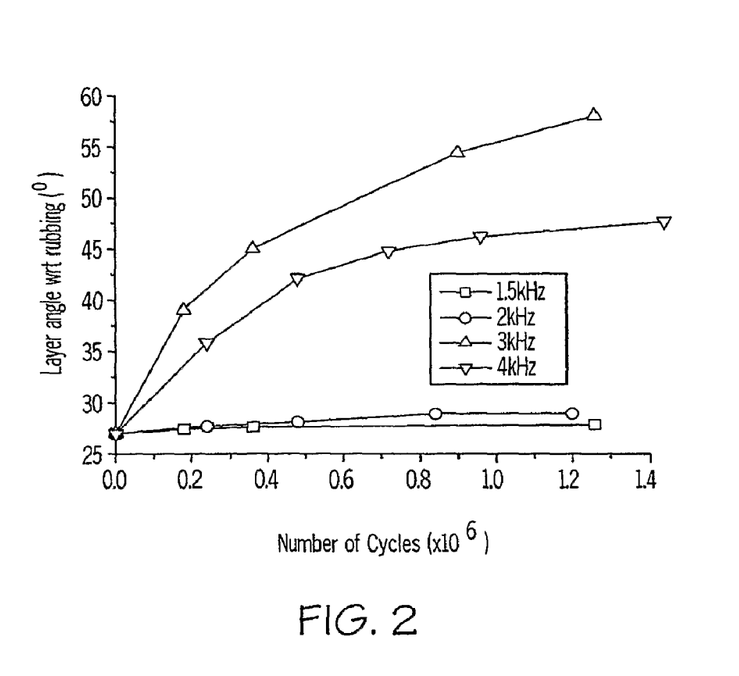
FIG. 2 is a graph showing the frequency dependence of layer rotation rate at 70° C.
Figure 3:
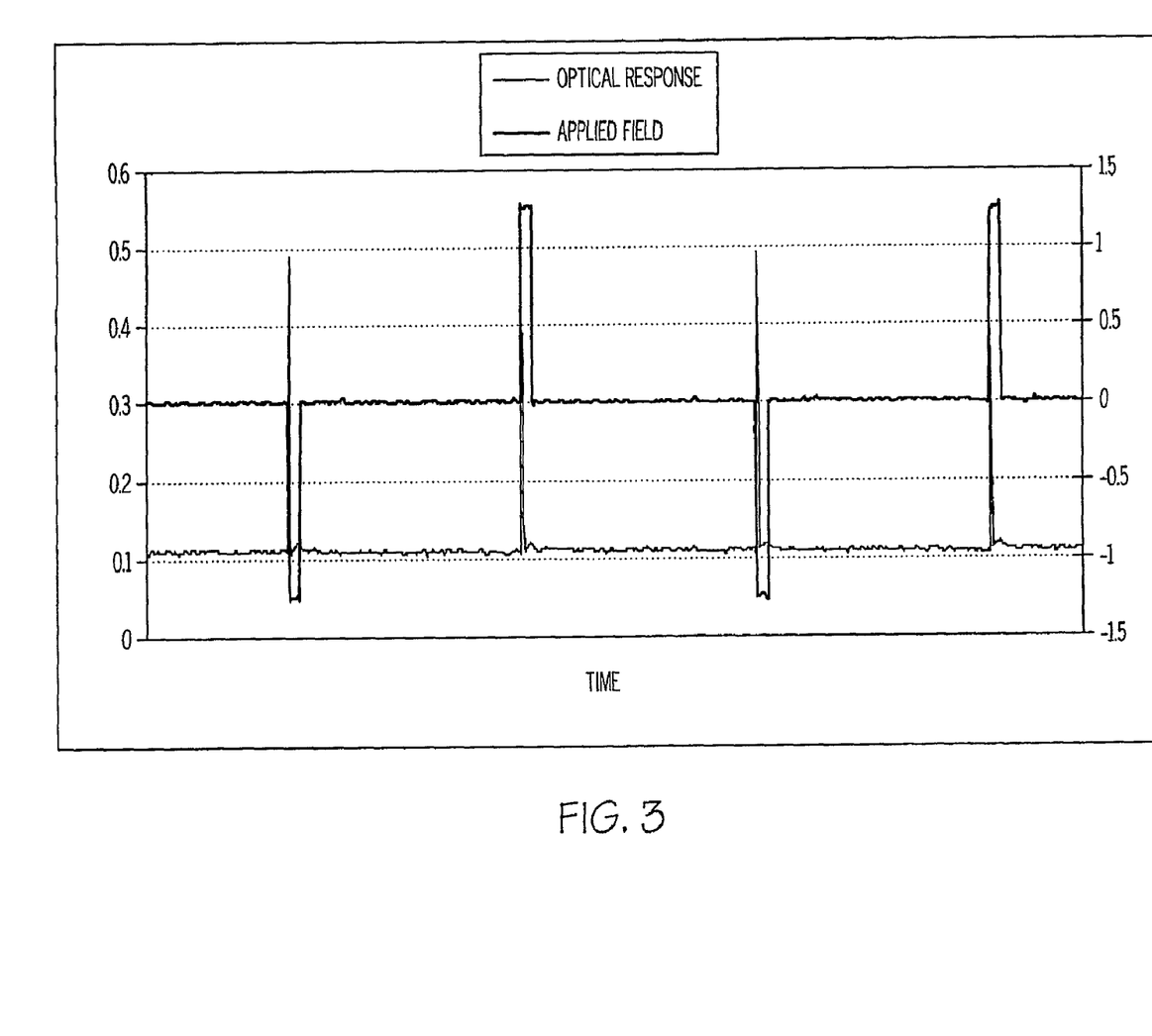
FIG. 3 is a graph showing the bistability profile of compound 2A in example 2.

Layer rotation was induced in compound 2A by applying asymmetric AC waveforms. Layer rotations were monitored in situ using the microscope. All waveforms were chosen to be DC balanced. Field amplitudes up to 18V/μm at several different frequencies were used. The rate of rotation depended on the frequency of the applied voltage, as shown in FIG. 2. A 50V peak voltage saw-tooth wave was applied to a 3.5 μm thickness cell (ca. 14.3 V/μm). The optimum frequency was found to be around 3 kHz at 70° C., which shifted to the lower frequency as the temperature decreased. At 50° C., a 1 kHz frequency rotated more efficiently than 3 kHz. The layers were found to rotate back to the initial position by applying an equal amplitude but opposite direction asymmetric waveform. A simple symmetric square waveform was also found to rotate the layers back to the original state. Confirmation of bistability was carried out after the rotation by application of a bipolar pulse, with a pulse width of 2.5 ms and 47.5 ms delay between the pulses (FIG. 3).

Chemical Structure of Compound 2A

Example 3

A siloxane-based ferroelectric liquid crystal compound 1A was synthesized. This compound had the phase sequence Iso→80° C.→SmC*→32° C.→Solid on cooling. This compound was placed between two indium-tin-oxide (ITO) coated glass substrates with the inner surfaces coated with anti-parallel rubbed nylon 6 as alignment layers. The gap size of the cells was adjusted with spacer beads, and ranged from 3 and 4.5 μm.

The test devices were placed in the cross polarized transmission microscope (Olympus BX51) equipped with photodetector, digital camera and an Instec HCS302 hot stage controlled by an Instec STC200. An output from a Tektronix AFG3101 arbitrary signal generator was amplified by FLC F20A to drive the test cell. The optical signal was monitored on a Tektronix TDS303413 oscilloscope via a photodetector mounted on the microscope.

Figure 4:
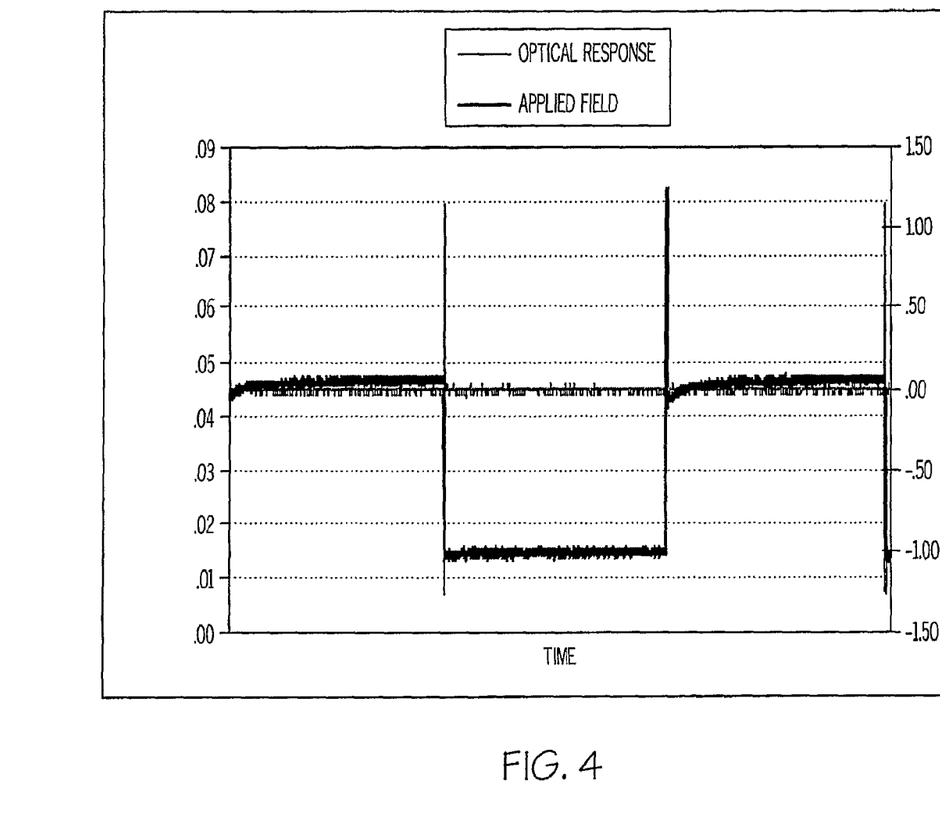
FIG. 4 is a graph showing the bistability profile of compound 1A in example 3.

Single domain bookshelf structures were formed on cooling from the isotropic phase to a temperature below the clearing point with a symmetric square wave of varying conditions. The amplitude of the alignment field ranged from 8V/μm to 18V/μm with a frequency of 500 Hz-3 kHz. The presence of a single domain was confirmed visually after the alignment process. Tilt angle (θ), response time (τr), and spontaneous polarization (Ps) were measured, and the resulting properties are tabulated in Table 2. The bistability profile for this compound was confirmed by applying a bipolar pulse, with a pulse width of 50 μs, and 6.5 ms delay between the pulses, and is shown in FIG. 4.

Chemical Structure of Compound 1A

TABLE 2

| EO properties of compound 1A. | | | |
|---|---|---|---|
| Temp(° C.) | Tilt (°) | τr (μs) | Ps (nC/cm2) |
| 40 | 39 | 160 | 60 |
| 75 | 37.5 | 27 | 75 |

While certain representative embodiments and details have been shown for purposes of illustrating the invention, it will be apparent to those skilled in the art that various changes may be made without departing from the scope of the invention, which is defined in the appended claims.

The invention claimed is:

1. A liquid crystal electro-optic device comprising:
   at least one liquid crystal cell comprising:
      a pair of substrates having a gap there between;
      a pair of electrodes, the pair of electrodes positioned on one of the substrates or one electrode positioned on each substrate; and
      a single liquid crystal material disposed in the gap between the pair of substrates, the liquid crystal material being a ferroelectric, oligosiloxane liquid crystal material exhibiting an I→SmC* phase sequence;
   wherein the ferroelectric, oligosiloxane liquid crystal material is selected from:

where R=W, or $C_dH_{(2d+1)}$ and d=1-10 and W= or a pyrimidine, or a tolane:

where R', and R"=are independently selected from $C_rH_{(2r+1)}$ and r=1 to 4, or a phenyl group; c=1 to 10; n=3-14; a=0 or 1; m=1 or 2; s=1 or 2; q=0 or 1, where T=O, CH=N, N=CH, $CF_2O$, $OCF_2$, NHCO, or CONH; Y=is independently selected from, H, halogen, $NO_2$, CN, $CH_3$, $CF_3$; Q=O, COO, or OCO, where b=0 or 1; and X=an alkyl group with at least one chiral center or halo-substituted alkyl group with at least one chiral center;
wherein the liquid crystal electro-optic device is bistable in operation.

2. The liquid crystal electro-optic device of claim 1 wherein at least one substrate has an alignment layer on an inner surface.

3. The liquid crystal electro-optic device of claim 2 wherein the alignment layer is selected from polyamide, polyimide, polyester, polytetrafluoroethylene, silicon oxide, silanes, and polysilanes.

4. The liquid crystal electro-optic device of claim 2 wherein the alignment layer is patterned.

5. The liquid crystal electro-optic device of claim 1 wherein there is one electrode on each substrate.

6. The liquid crystal electro-optic device of claim 1 wherein at least one electrode covers a selected region of the inner surface.

7. The liquid crystal electro-optic device of claim 1 wherein at least one electrode is a transparent electrode.

8. The liquid crystal electro-optic device of claim 1 wherein at least one substrate is transparent.

9. The liquid crystal electro-optic device of claim 1 wherein the gap is between about 0.5 microns and 10 microns.

10. The liquid crystal electro-optic device of claim 1 further comprising a pair of polarizers adjacent to the pair of substrates on a side of the substrate opposite the ferroelectric, oligosiloxane liquid crystal material.

11. The liquid crystal electro-optic device of claim 1 wherein the ferroelectric, oligosiloxane liquid crystal material is combined with a ferroelectric liquid crystal material.

12. The liquid crystal electro-optic device of claim 1 wherein the tilt angle of the oligosiloxane liquid crystal material is greater than about 20°.

13. The liquid crystal electro-optic device of claim 1 wherein the liquid crystal electro-optic device is selected from an active matrix direct view FLC flat panel display, a passive matrix direct view FLC flat panel display, or a liquid crystal on silicon (LCoS) device.

14. The liquid crystal electro-optic device of claim 1 wherein n=11-14.

15. The liquid crystal electro-optic device of claim 1 wherein the ferroelectric, oligosiloxane liquid crystal material is selected as:

with L being independently selected from H or a halogen.

16. The liquid crystal electro-optic device of claim 1 wherein W is selected as:

with L being independently selected from H or a halogen.

17. The liquid crystal electro-optic device of claim 15 wherein W is selected as:

with L being independently selected from H or a halogen.

18. A method of making a liquid crystal electro-optic device comprising:
providing a pair of substrates with a pair of electrodes thereon, the pair of electrodes positioned on one of the substrates or one electrode positioned on each substrate, the pair of substrates having a gap there between;
providing single liquid crystal material in the gap between the pair of substrates, the liquid crystal material being a ferroelectric, oligosiloxane liquid crystal material exhibiting an I→SmC* phase sequence;
wherein the ferroelectric, oligosiloxane liquid crystal material is selected from:

where R=W, or $C_dH_{(2d+1)}$ and d=1-10 and W= or a pyrimidine, or a tolane:

where R', and R''=are independently selected from $C_rH_{(2r+1)}$ and r=1 to 4, or a phenyl group; c=1 to 10; n=3-14; a=0 or 1; m=1 or 2; s=1 or 2; q=0 or 1, where T=O, CH=N, N=CH, $CF_2O$, $OCF_2$, NHCO, or CONH; Y=is independently selected from, H, halogen, $NO_2$, CN, $CH_3$, $CF_3$; Q=O, COO, or OCO, where b=0 or 1; and X=an alkyl group with at least one chiral center or halo-substituted alkyl group with at least one chiral center; and applying a first electric field to align the liquid crystal device while cooling the ferroelectric, oligosiloxane liquid crystal material, or while the ferroelectric, oligosiloxane liquid crystal material is in the SmC* phase, or both, to create a monodomain.

19. The method of claim 18 further comprising applying a second electric field to rotate the monodomain.

20. The method of claim 18 further comprising applying a third electric field to the liquid crystal electro-optic device to repair a defect in the device.

21. The method of claim 18 wherein the first electric field is a square wave electric field.

22. The method of claim 18 wherein the first electric field is 1 to 25 V/μm.

23. The method of claim 18 wherein the first electric field has a frequency of 10 Hz to 25 kHz.

24. The method of claim 19 wherein the second electric field is an asymmetric waveform electric field.

25. The method of claim 18 wherein the ferroelectric, oligosiloxane liquid crystal material is selected as:

with L being independently selected from H or a halogen.

26. The method of claim 18 wherein W is selected as:

with L being independently selected from H or a halogen.

27. The method of claim 25 wherein W is selected as:

with L being independently selected from H or a halogen.

* * * * *

UNITED STATES PATENT AND TRADEMARK OFFICE
CERTIFICATE OF CORRECTION

PATENT NO. : 8,025,937 B2
APPLICATION NO. : 12/296612
DATED : September 27, 2011
INVENTOR(S) : Terry V. Clapp et al.

It is certified that error appears in the above-identified patent and that said Letters Patent is hereby corrected as shown below:

Col. 5, line 14, the formula "$C_dH_{2(d+1)}$" should read $C_dH_{(2d+1)}$

Col. 6, line 14, the formula "$C_rH_{2(r+1)}$" should read $C_rH_{(2r+1)}$

Col. 7, line 13, the formula "$C_dH_{2(d+1)}$" should read $C_dH_{(2d+1)}$

Col. 7, line 31, the formula "$C_rH_{2(r+1)}$" should read $C_rH_{(2r+1)}$

Signed and Sealed this
Thirteenth Day of March, 2012

David J. Kappos
*Director of the United States Patent and Trademark Office*